United States Patent [19]

Braeger et al.

[11] Patent Number: 4,748,723
[45] Date of Patent: Jun. 7, 1988

[54] APPARATUS FOR GAINING PINBONE-FREE FILLETS OF FISH

[75] Inventors: Horst Braeger; Wolfgang Möller, both of Lübeck, Fed. Rep. of Germany

[73] Assignee: Nordischer Maschinenbau Rud. Baader GmbH×CO KG, Lubeck, Fed. Rep. of Germany

[21] Appl. No.: 6,506

[22] Filed: Jan. 22, 1987

[30] Foreign Application Priority Data

Jan. 22, 1986 [DE] Fed. Rep. of Germany ....... 3601767

[51] Int. Cl.⁴ ............................................ A22C 25/16
[52] U.S. Cl. ............................................ 17/54; 17/57
[58] Field of Search ......................... 17/54, 56, 57, 61

[56] References Cited

U.S. PATENT DOCUMENTS

| 4,025,988 | 5/1977 | Hartmann | 17/56 X |
| 4,365,387 | 12/1982 | Hartmann | 17/56 X |
| 4,574,430 | 3/1986 | Hartmann | 17/56 |

Primary Examiner—Wille G. Abercrombie
Attorney, Agent, or Firm—Thomas R. Morrison

[57] ABSTRACT

The invention relates to an apparatus for gaining boneless fish fillets. In a fish filleting machine which processes the fish being conveyed tail first and comprises a belly and back filleting tool, and a severing tool for releasing meat bands on either side of the spinal column in the tail region, a pinbone tool is arranged between the two first-mentioned tools, this pinbone tool comprising circular knives between which a graving knife is arranged for severing the meat strip containing the pinbones immediately after this strip has been cut free.

12 Claims, 3 Drawing Sheets

APPARATUS FOR GAINING PINBONE-FREE FILLETS OF FISH

BACKGROUND OF THE INVENTION

1. Field of the Invention

The invention relates to an apparatus for gaining pinbone-free fillets of fish conveyed tail first along a conveying path extending along a series of processing tools arranged on either side of said path, the apparatus comprising belly and back filleting tools for cutting free the belly and back spokes, rib severing tools for releasing the fillets from the ribs, severing tools for completely severing the fillets from the sides of the spinal column, and pinbone tools arranged between the belly and back filleting tools, on the one hand, and the rib severing tools, on the other, and being movable under control into the path of the fish during the passage of the belly cavity, said pinbone tools each comprising two spaced circular knives, driven to rotate around a common shaft, for making incisions extending substantially normal to the plane of symmetry of the fish below and above the pinbones essentially up to the ribs and the lateral vertebral appendages, respectively.

2 Prior Art

U.S. Pat. No. 3,570,048 discloses a method and an apparatus which are characterized in that prior to making the first filleting cuts, the pinbones (also termed meat bones in some countries) are cut free by two cuts each, made on either side of the fish in the vicinity of the abdominal cavity.

This method did not prove successful, because there was still a need to trim the fillets manually by removing the meat strip containing the pinbones still connected to the fillets at the end thereof. Thus, this method was not satisfactory, particularly with regard to the attainable rationalization effect. Moreover, it was found that particularly in the case of soft fish and due to the necessary external guidance of the fish during the making of the pinbone cuts, which results in deformation, an economical pinbone cut was only possible when accompanied by an increasing risk of meat bone residues remaining in the fillets.

Therefore, other methods have been developed and are directed at achieving the sought bone freedom of the fillets by removing the belly flaps, including the pinbone strips therein.

Such a method is disclosed in German Pat. No. 24 60 447. After making the belly and back filleting cuts, incisions are made above the pinbone strip, and the fillets are severed from the flanks of the spine and finally cut free by crosscuts made outwardly from the belly filleting cuts in the vicinity of the abdominal cavity end. This is followed by the separation of the belly flaps, attached to the bone structure and including the pinbone row, from the ribs and lateral vertebral appendages.

Apart from a considerable expenditure on guidance and additional conveying means, this method also leads to a quality-reducing stressing of the fillets. However, the method-based stipulation of a boneless fillet without any belly flaps is disadvantageous, because, as part of the fillets, said flaps increase their selling price, whereas the separately obtained flaps can only be utilized as fish farce.

3. OBJECTS OF THE INVENTION

It is, therefore, an essential object of the present invention to gain fillets which are obtained free of pinbones without making any manual processing necessary.

It is another object of the invention to make it possible to sort out the fillets and the portions containing the pinbones at separate locations of the working process, respectively.

SUMMARY OF THE INVENTION

In an apparatus for gaining pinbone-free fish fillets, which apparatus comprises belly and back filleting tools for cutting free the belly and back spokes, rib severing tools for releasing the fillets from the ribs, severing tools for completely severing the fillets from the sides of the spinal column, and pinbone tools arranged between the belly and back filleting tools, on the one hand, and the rib severing tools, on the other, and being movable under control into the path of the fish during the passage of the belly cavity, said pinbone tools each comprising two spaced circular knives, driven to rotate around a common shaft, for making incisions extending substantially normal to the plane of symmetry of the fish below and above the pinbones essentially up to the ribs and the lateral vertebral appendages, respectively, these objects are achieved according to the present invention, in that a graving knife, which has a cutting edge extending substantially parallel to said shaft and which substantially fills the gap between the circular knives of the pinbone tool is arranged between these circular knives such that its cutting edge projects by a small amount beyond the periphery of the circular knives in their area facing the path of the fish.

It has proved advantageous to provide the circular knives with different diameters to adapt the knives to the anatomical conditions of the fish skeleton and to arrange the thus provided knives to rotate in such direction that their effective cutting edges rotate in the conveying direction of the fish, thus accompanying the latter.

Also, a particularly expedient handling of the apparatus according to the present invention is achieved by way of an embodiment comprising a measuring feeler supplying a measuring signal corresponding to the thickness of the fish being processed, wherein each pinbone tool is provided with a control and setting member, whose operation takes place whilst taking account of the measuring signal modified by electronic processing and corresponding to the particular fish thickness. Furthermore, the apparatus according to the present invention may be used rather universally by utilizing the measuring signal by adapting it to the fish species to be processed.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DETAILED DESCRIPTION OF THE PREFERRED EMBODIMENT

Figure 1:
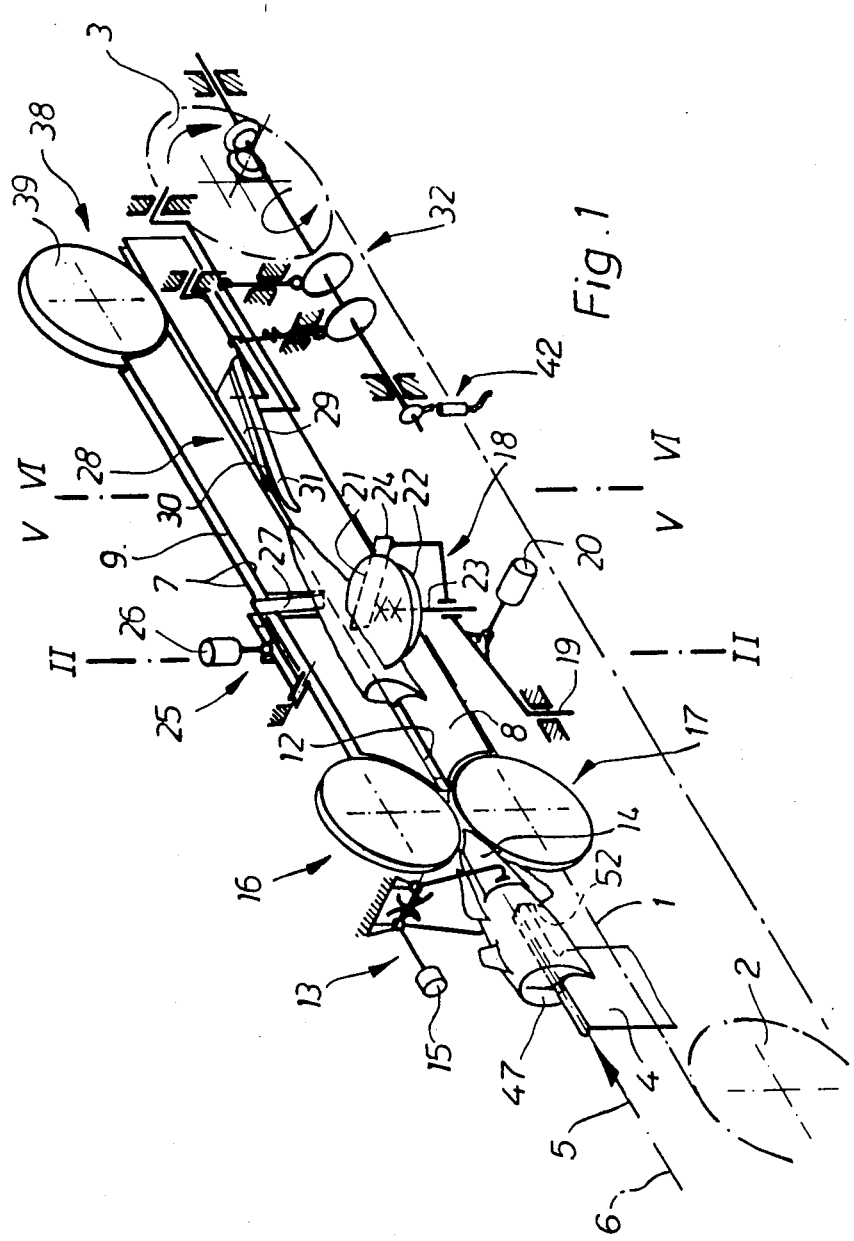
FIG. 1 shows a diagrammatic overall view of an apparatus according to the invention by way of an axonometric representation.

An endless conveyor 1 of a fish filleting machine comprises deflection wheels 2, 3, which are mounted in a not shown frame of said machine. The conveyor 1 is equipped with push saddles 4, spaced with respect to one another, and can be driven in an appropriate manner in the direction of arrow 5. The push saddles 4 are advanced by conveyor 1 within a guide path 6, which is formed by two upper guide members, acting as back guides 7, and two lower guide members, acting as belly guides 8. The back guides 7 and belly guides 8 define a vertical guide gap or clearance 9, in which the push saddles 4 are guided, guide edges 10, 11 of the guides 7, 8 forming a lateral gap or clearance 12 level with the guide path 6. Along the same and symmetrical thereto is successively provided a series of working tools. When seen in the advancing direction according to arrow 5, the series starts with a measuring feeler 13 provided with oppositely synchronized sensing surfaces 14 and coupled to an angle coder 15. The sensing surfaces 14 are arranged to extend up to the periphery of the circular knives of a subsequent back filleting tool 16 and belly filleting tool 17. The arrangement is such that the first-mentioned tool 16 is positioned above the guide path 6 and the last-mentioned tool 17 below the same. The circular knives, between each other, leave a horizontal gap or clearance level with the guide path 6, which is continued in the gap 12 between the directly following back guides 7 and belly guides 8. This is followed by a pinbone tool 18 comprising one unit each arranged on either side of the guide gap 9, these units being pivotable relative to the guide gap 9 about a vertical axis 19 by means of a control and setting member 20 and each comprising an upper circular knife 21 associated with the guide edges 10 of the back guides 7 and a smaller diameter lower circular knife 22 associated with the guide edges 11 of the belly guides 8. Between the circular knives 21, 22, driven so as to rotate about a vertical shaft 23, there is a graving knife 24, whose cutting edge runs in a plane parallel to the shaft 23 and is positioned in such a way that it projects slightly over the periphery of the circular knives 21, 22 in an area thereof facing the belly guides 8 and back guides 7, respectively. Downstream of the pinbone tool 18 and above the guide path 6, there is provided a severing tool 25 including a pair of graving tool-like severing gravers 27, which can be raised and lowered synchronously by means of a control and setting member 26 and which extend in the planes of the back guides 7. The severing tool 25 is followed by a rib severing tool 28, which comprises scraping tools arranged on either side of the guide path 6 in a mirror-inverted manner and each constituted by a scraping knife 29 equipped with a diverging cutting edge 30 and a counterpart 31 co-operating with the cutting edge 30. The counterpart 31 and the scraping knife 29 can be moved by means of a cam gear 32 synchronously to the rotation of the conveyor 1 relative to gap 12.

Figure 2:
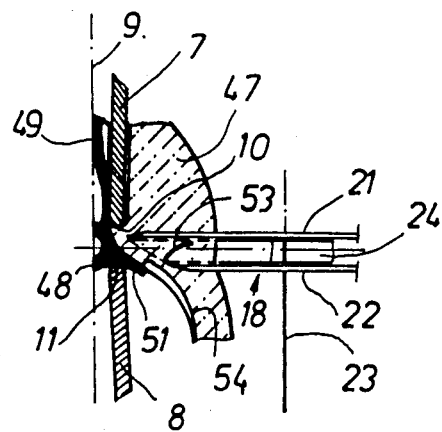
FIG. 2 shows a one-sided cross-section through the apparatus along section line II—II, of FIG. 1.
Figure 3:
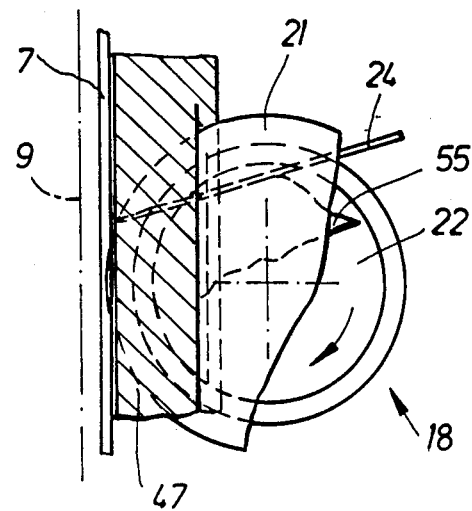
FIG. 3 shows a detail plan view of a pinbone tool according to FIG. 2.
Figure 5:
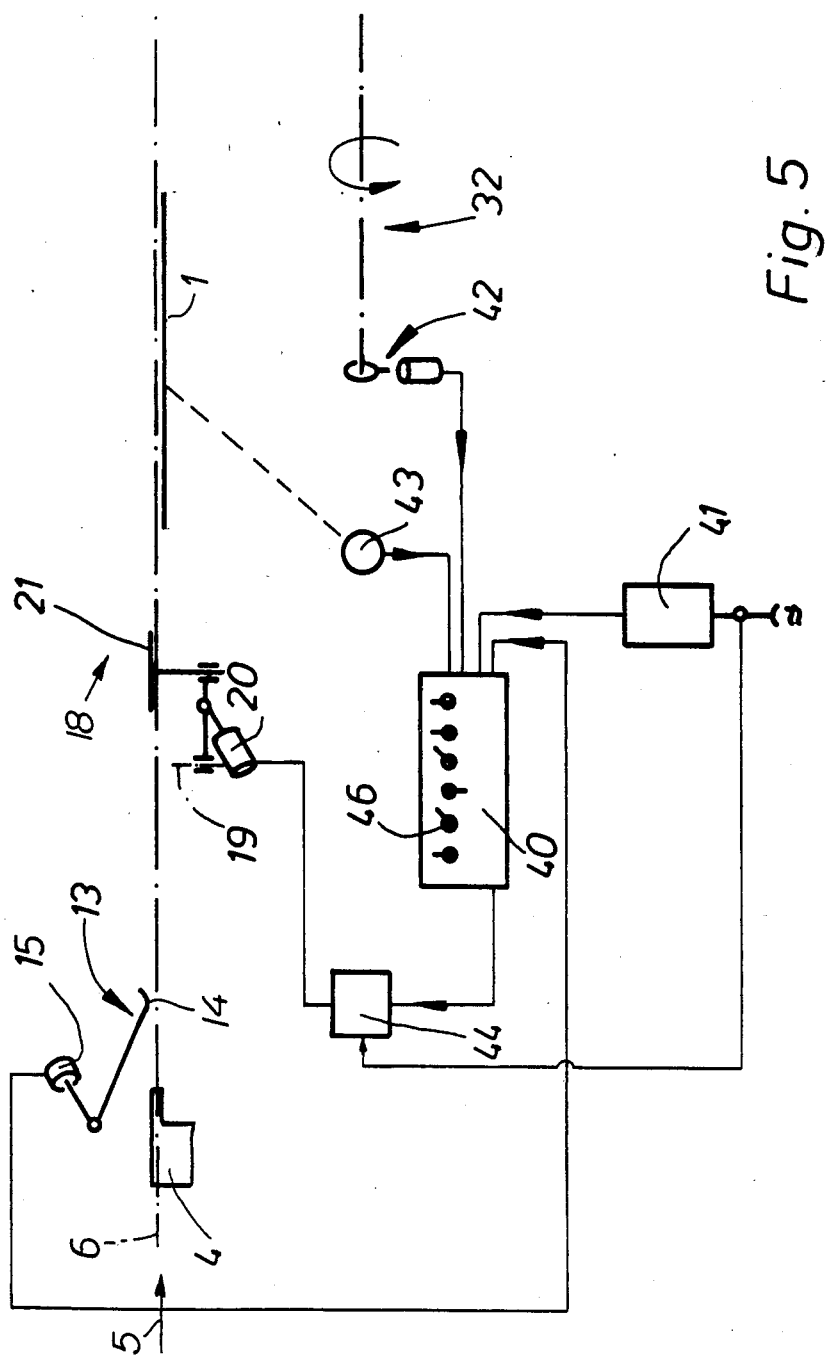
FIG. 5 shows a block diagram of the control system.

According to FIG. 5, the control of the times of operation of the pinbone tool 18 takes place by electronically processing the measuring signal detected by the angle coder 15 and corresponding to the thickness of the fish to be processed. This signal is supplied to a computer unit 40, which is supplied with power by a power supply unit 41. Further signals influencing the function of the computer unit 40 come from a timing generator 42, supplying a pulse for each passage of a push saddle 4 and revolving with the driving shaft of the cam gear 32, and from a speed transmitter 43 installed in a high-speed part of the drive of the conveyor 1. The output signals are supplied to the control and setting member 20 by means of an intermediately connected power part 44. Selector switches 46 permit a programme preselection, with the effect that the times for and periods of activating the control member 20 can be adapted to the processing of specific, different fish types. Such differences can e.g. consist in the row of pinbones 53 (FIG. 2), which in the case of saithe (pollachius virens) only extend over one third of the length of the abdominal cavity, so that, in this case, the control member 20 is actuated at a later time, whilst also taking account of the measuring signal of the angle coder 15.

Figure 4:
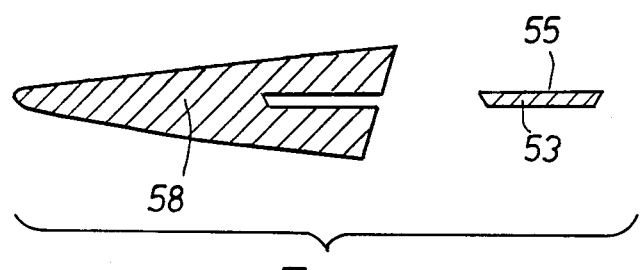
FIG. 4 shows a bone-free fillet produced using the apparatus according to FIG. 1.

The function of the apparatus is as follows:

A fish 47, which, at least, has had its abdominal cavity opened and been gutted is placed by means of its abdominal cavity on a push saddle 4 advanced by the conveyor 1 in such a way that its tail points in the direction of arrow 5. During conveying, the fish 47 pushes between the sensing faces 14 of the measuring feeler 13, the greatest deflection thereof being recorded in the form of a measuring signal by means of the angle coder 15. The sensing faces 14, acting as alignment means, guide the fish 47 with its tail fin between the circular knives of the back filleting tool 16 and belly filleting tool 17, said tools starting to cut into the fish 47 on either side of the back spokes 49 (FIG. 2) and belly spokes (not specifically referred to in the drawings) up to the vertebral column 48 and, in the vicinity of the abdominal cavity, up to the lateral vertebral appendages 51, respectively. During the further advance of the fish 47 the back guides 7 and belly guides 8 penetrate the incisions made and take over the guidance of the fish 47 by receiving between them the meat strips containing the back spokes 49 and the belly spokes. The lateral vertebral appendages 51 and ribs 54 in the vicinity of the abdominal cavity are guided in the lateral gap 12 between the back guides 7 and belly guides 8. When the abdominal cavity end 52 arrives in the region of the pinbone tool 18, the latter is pivoted in the direction of guide gap 9 whilst taking account of the measuring signal of feeler 13, so that incisions extending parallel to the spine 48 are made above and below the row of pinbones 53 and up to the spine 48 and ribs 54, respectively. Simultaneously, with the penetration of the circular knives 21, 22 into the fillet meat, the graving knife 24 is also moved towards the fish body and, following the separation of the skin and whilst joining the two pinbone cuts, also penetrates the fillet meat. As a result of the continued conveying of the fish 47, the meat strip 55 (FIG. 4), containing the pinbones 53, is progressively scraped free and removed. During the performance of the pinbone cuts, the abdominal cavity end 52 reaches the vicinity of the severing tool 25, at which time the graver 27 is briefly brought into a position crossing the gap 12 with the aid of the control and setting member 26, so that the meat bands still connecting the fillets with the sides of the spine 48 are severed in the vicinity of the abdominal cavity end 52. The fish 47, thus processed, is then supplied to the rib severing tool 28, which initially remains in a position below the guide edges 11 (FIG. 1) of the belly guides 8 in order to guide the tail of the fish 47 thereabove, whereby the bellyside fillet halves are being laterally spread out in this area. When the abdominal cavity end 52, which coincides with the tip of the push saddle 4, arrives the scraping knives 29 are raised with the aid of the cam gear 32 until their tips come into the vicinity of the guide edges 10 of the back guides 7. They pass through the lateral free-cuts made by the gravers 27 of the severing tool 25. Simultaneously, the counterparts 31 are moved with their tips into the vicinity of the guide edges 11 of belly guides 8. The scraping knives 29 thus seek their path in the area above the attachment points of the lateral vertebral appendages 51 on the back spokes 49, whilst the counterparts 31 lift the lateral vertebral appendages 51 and ribs 54 against the scraping tools 29. The fillets 58 (FIG. 4), at this stage still attached in the tail region to the aforementioned meat bands on the sides of spine 48, are cut free thereafter while severing the meat bands by means of the circular knives 39 (FIG. 1) of the following separating tool 38. Thus, a product as shown in FIG. 4 is obtained.

What is claimed is:

1. An apparatus for processing fish to obtain fish fillets, said fish having a skeleton structure defining a vertical plane of symmetry, which skeleton structure is enclosed by meat to result, at least partially, in said fillets and by skin covering said meat on the outside thereof and includes a vertebral column extending from a head end towards a tail end; vertebral appendages extending laterally from said vertebral column in the forward head end area thereof and carrying ribs extending downwardly and enclosing a belly cavity; belly spokes extending downwardly from said vertebral column between the end of said belly cavity and said tail end; back spokes extending upwardly from said vertebral column over at least most of its extension; and pinbones extending from said vertebral appendages into said meat above said ribs; said apparatus defining a conveying path for said fish to be processed and comprising a series of processing tools arranged along said path and on either side thereof and including (a) belly and back filleting tools for cutting free said belly and back spokes;
(b) rib severing tools for releasing said fillets from said ribs;
(c) severing tools for completely severing said fillets from the sides of said vertebral column;
(d) pinbone tools arranged between said belly and back filleting tools, on the one hand, and said rib severing tools, on the other, and being moveable under control into said path of the fish during the passage of said belly cavity, said pinbone tools each comprising two spaced circular knives driven to rotate around a common shaft for making incisions extending substantially normal to said plane of symmetry of said fish below and above said pinbones essentially up to said ribs and said lateral vertebral appendages, respectively, wherein said apparatus further comprises (e) a graving knife, which has a cutting edge extending substantially parallel to said shaft; said graving knife substantially fills said gap between said circular knives of said pinbone tool; and is arranged between said circular knives such that its cutting edge projects by a small amount beyond the periphery of said circular knives in their area facing said path of the fish.

2. An apparatus as claimed in claim 1, wherein the circular knives rotate in a direction making their cutting edges move in the direction in which the fish is conveyed.

3. An apparatus as claimed in claim 1, wherein said two spaced circular knives of said pinbone tool have different diameters.

4. An apparatus as claimed in claim 2, wherein said two spaced circular knives of said pinbone tool have different diameters.

5. An apparatus as claimed in claim 1 comprising a measuring feeler supplying a measuring signal corresponding to the thickness of the fish being processed, wherein each of said pinbone tools includes a control and setting member responsive to said measuring signal modified by an electronic processor.

6. An apparatus as claimed in claim 2 comprising a measuring feeler supplying a measuring signal corresponding to the thickness of the fish being processed, wherein each of said pinbone tools includes a control and setting member responsive to said measuring signal modified by an electronic processor.

7. An apparatus as claimed in claim 3 comprising a measuring feeler supplying a measuring signal corresponding to the thickness of the fish being processed, wherein each of said pinbone tools includes a control and setting member responsive to said measuring signal modified by an electronic processor.

8. An apparatus as claimed in claim 4 comprising a measuring feeler supplying a measuring signal corresponding to the thickness of the fish being processed, wherein each of said pinbone tools includes a control and setting member responsive to said measuring signal modified by an electronic processor.

9. An apparatus as claimed in claim 5, wherein said apparatus further comprises selector switches on said electronic processor for converting said measuring signal in accordance with the fish type to be processed.

10. An apparatus as claimed in claim 6, wherein said apparatus further comprises selector switches on said electronic processor for converting said measuring signal in accordance with the fish type to be processed.

11. An apparatus as claimed in claim 7, wherein said apparatus further comprises selector switches on said electronic processor for converting said measuring signal in accordance with the fish type to be processed.

12. An apparatus as claimed in claim 8, wherein said apparatus further comprises selector switches on said electronic processor for converting said measuring signal in accordance with the fish type to be processed.

* * * * *